United States Patent [19]

Solomon

[11] Patent Number: 5,372,768
[45] Date of Patent: Dec. 13, 1994

[54] METHOD FOR INVESTMENT CASTING UTILIZING THERMOPLASTIC COMPOSITIONS CONTAINING A CROSS-LINKED POLYMER OF METHYL METHACRYLATE

[75] Inventor: Paul Solomon, Glencoe, Ill.

[73] Assignee: Yates Manufacturing Co., Chicago, Ill.

[21] Appl. No.: 113,858

[22] Filed: Aug. 30, 1993

Related U.S. Application Data

[60] Division of Ser. No. 816,572, Jan. 3, 1992, Pat. No. 5,270,360, which is a continuation-in-part of Ser. No. 590,683, Oct. 1, 1990, abandoned, which is a continuation-in-part of Ser. No. 441,325, Nov. 27, 1989, abandoned.

[51] Int. Cl.⁵ .............................................. B29C 33/40
[52] U.S. Cl. ..................................... 264/221; 264/317; 264/331.18; 164/45
[58] Field of Search ............... 264/215, 221, 299, 317, 264/331.18; 164/45

[56] References Cited

U.S. PATENT DOCUMENTS

| | | |
|---|---|---|
| 2,752,315 | 6/1956 | Kuettel . |
| 3,884,708 | 5/1975 | Burkert . |
| 3,887,382 | 6/1975 | Solomon . |
| 3,964,915 | 6/1976 | Doenges et al. ............... 106/38.6 |
| 3,969,469 | 7/1976 | Love . |
| 3,992,486 | 11/1976 | Lang . |
| 4,046,579 | 9/1977 | Martin . |

FOREIGN PATENT DOCUMENTS

48-17541  5/1973  Japan .

OTHER PUBLICATIONS

Billmeyer, Jr.; Fred W., *Textbook of Polymer Science*, Third Ed., John Wiley & Sons, New York, 1984, pp. 436–453.

*Hawley's Condensed Chemical Dictionary*, Eleventh Ed., Van Nostrand Reinhold, New York, 1987, pp. 34–35 and 1233.

*Primary Examiner*—Joseph L. Schofer
*Assistant Examiner*—R. H. Delmendo
*Attorney, Agent, or Firm*—Dressler, Goldsmith, Shore & Milnamow, Ltd.

[57] ABSTRACT

A two-phase thermoplastic composition adapted for forming thermoplastic patterns. The composition comprises an organic thermoplastic pattern material and at least about 5% by weight of discrete particles of cross-linked poly(methylmethacrylate) that are physically stable at temperatures above 130° F. Also disclosed are investment casting patterns of such composition and processes utilizing such composition.

3 Claims, No Drawings

METHOD FOR INVESTMENT CASTING UTILIZING THERMOPLASTIC COMPOSITIONS CONTAINING A CROSS-LINKED POLYMER OF METHYL METHACRYLATE

CROSS-REFERENCE TO COPENDING PATENT APPLICATION

This is a division of co-pending U.S. patent application Ser. No. 07/816,572, filed Jan. 3, 1992, now U.S. Pat. No. 5,270,360, which is in turn a continuation-in-part of co-pending U.S. patent application Ser. No. 07/590,683, filed Oct. 1, 1990, now abandoned, which in turn is a continuation-in-part of U.S. patent application Ser. No. 07/441,325, filed Nov. 27, 1989, now abandoned.

BACKGROUND OF THE INVENTION

This invention relates to improved pattern-forming compositions, and more particularly to improved pattern-forming thermoplastic compositions for use in investment casting processes, and to improved investment casting patterns and processes using such compositions.

Various investment casting processes, also called lost wax processes, have been known for centuries. Through the ages, compositions for the construction of disposable patterns used in such processes have been selected for several characteristics, including such important properties as dimensional reproducibility and the ability to produce a highly accurate surface finish in the molded disposable pattern. Because such properties are critical to many products manufactured by lost wax processes, repeated efforts have been and are being made to improve such properties of pattern-forming compositions.

The quality and properties of an investment casting depend inextricably upon the quality of the disposable pattern, which, in turn, depends upon the characteristics of the pattern-forming compositions of which the disposable patterns are molded.

Disposable thermoplastic patterns are usually formed by heating and melting a thermoplastic composition which is adapted to form a pattern, introducing the molten composition into a mold, and then cooling the composition until it solidifies to form a disposable pattern. Thereafter, the disposable thermoplastic pattern is removed from the mold, assembled with the other patterns, if necessary, and then encased in a mold forming material, usually a ceramic material, in accordance with one of a variety of known methods, thereby forming a shell or cast about the disposable pattern.

Next, a major portion of the disposable pattern is removed by melting at a moderately elevated temperature by autoclaving, and substantially all of the remainder of the pattern material is removed at a substantially higher temperature by vaporization or burning or both so that, except for any ash residue from the pattern material, the inner surface of the shell or mold is clean. The shell or mold is then ready for one-time use for forming an investment cast part. A text describing known procedures used in lost wax processes is entitled *Investment Casting*, H. T. Bidwell, Machinery Publishing Co., Ltd., England, 1969.

By this process, the surface characteristics of the disposable pattern and of the ceramic shell are "transferred" to the final casting. Thus, the above-discussed properties of the pattern-forming composition and any residue therefrom will affect the surface characteristics and metallurgical characteristics of a casting. Similarly, variations in expansion and contraction of compositions from which disposable patterns are formed result in shells or casts of varying dimensions, and therefore inconsistent castings. Accordingly, the properties of pattern-forming compositions are critical to the investment casting.

Therefore, a satisfactory composition comprising thermoplastic pattern material should not only resist change in dimensions with changes in temperature, but also leave little or no ash residue after burning so that an accurate casting may be made. An ash residue which is essentially stable at burning temperatures (e.g., 1800° F.) and which volatilizes at the temperature of molten steel (e.g., 3000° F.) is particularly harmful since it tends to leave gas bubble irregularities on the surface of the cast product. Therefore, it is desired that the composition leave no more than 0.1%, and preferably no more than 0.01%, by weight of ash when burned at 1800° F.

When the composition comprising thermoplastic pattern material is heated, it is also desirable that the material not decompose before melting, and that it be capable of flowing freely when thoroughly melted. A thermoplastic composition that melts to a free flowing state can be substantially emptied from a mold in the molten state, thereby minimizing the burden on the subsequent burning operation and forming a minimum of objectional fumes on burning. It is thus desired that the thermoplastic material have a viscosity at 248° F. (120° C.) of no greater than 5000 centipoise. At 200° F. (93° C.), the viscosity of the thermoplastic material should have a viscosity of no greater than about 20,000 cps, preferably no greater than about 10,000 cps.

Many thermoplastic pattern-forming compositions have been used or suggested for use in the past. As the name "lost wax" process implies, waxes, such as natural waxes, including beeswax and the like, were originally used as thermoplastic pattern materials. As other pattern materials were sought to improve the properties of disposable patterns, other natural thermoplastics, such as gum damar, gum rosin, esparto waxes, and the like, mineral waxes, such as those extracted from soft coal, and the like, and petroleum waxes were adopted for use.

As a result of this search, modified waxes, such as microcrystalline waxes, were developed for use in lost wax processes. More recently, as a result of the continuing efforts of researchers to improve upon and develop new thermoplastic materials, synthetic thermoplastics have been used as pattern materials or as thermoplastic pattern forming composition modifiers. Those efforts have also resulted in the use by some investment casters of materials other than thermoplastic pattern materials, such as mixtures of metallic salts and mercury. Moreover, pattern compositions that flow out of a mold more quickly and completely than conventional compositions have been sought.

Other efforts to increase the dimensional accuracy and stability of thermoplastic pattern-forming compositions involve the addition of solid filler materials. Accordingly, thermoplastic polystyrene powder, especially polystyrene cross-linked with divinylbenzene, and urea powder have been included in minor quantities in thermoplastic pattern-forming compositions as filler material. A "filler" is a solid particulate that is included as an inert additive in the sense that it does not react chemically with the thermoplastic through which it is dispersed. The filler remains a separate phase and retains its solid particulate identity throughout the investment casting process. Organic acids, such as fumaric acid, adipic acid and isophthalic acid, have also sometimes been used as solid fillers. Usually the filler is included in amounts of up to about 40% by volume of the thermoplastic pattern-forming composition, and in a particle size generally in the range of about 175 to 250 mesh. Thus, for a typical filler, at least about 90%, preferably 100%, by weight of the particles may pass through a 100 mesh sieve and at least about 50%, preferably about 50%, by weight of the particles pass through a 200 mesh sieve.

However, these fillers suffer several drawbacks. For example, conventional fillers commonly contain an organic component that produces an ash residue at the elevated temperatures involved in the investment casting process. Thus, as an illustration, polystyrene contains a carbonaceous benzene ring which may decompose to form carbon in addition to hydrogen gas. The ash residue, i.e., the impurity, thereby introduced into the mold limits accurate dimensional reproducibility and the ability to produce a highly accurate surface finish in the molded disposable pattern. Thus, standard fillers have been found to leave undesirably high amounts of ash residue in the mold.

Various fillers also involve several other problems. For example, urea tends to decompose when wax is melted, thermoplastic styrene can melt if overheated and organic acids have high specific gravities, and so tend to settle quickly when not sufficiently agitated. In addition, many fillers have a relatively high thermal conductivity, which can lead to premature expansion of the composition upon autoclaving, thereby causing shell cracking.

Thus, fillers for pattern-forming materials are still needed that aid the composition in flowing out of a mold more quickly and completely, that leave less ash residue in the mold, and that result in patterns with smooth surfaces and less shrinkage.

SUMMARY OF THE INVENTION

Among the several objects of the present invention, therefore, may be noted the provision of a disposable pattern-forming composition for the investment casting processes which results in dimensional reproducibility in investment casting processes; the provision of such composition which has the ability to attain a highly accurate surface finish in the molded disposable pattern; the provision of such composition which leaves little or no ash residue after burning so that an accurate casting may be made; the provision of a disposable thermoplastic pattern of such composition; and the provision of a method for investment casting involving use of such composition.

Briefly, therefore, the present invention is directed to a two-phase thermoplastic composition adapted for forming thermoplastic patterns. The composition, which is suitable for use as a pattern material for investment casting, comprises at least about 30% by weight of a continuous phase of organic thermoplastic material having a viscosity at 200° F. of less than about 20,000 cps and, as a filler, at least about 5% by weight of a dispersed phase of discrete particles of cross-linked poly(methylmethacrylate) that are physically stable at temperatures above 130° F.

The invention is further directed to a disposable thermoplastic pattern adapted for use in investment casting. The pattern comprises a solid body of a predetermined shape. The body comprises thermoplastic composition as set forth above.

The invention is also directed to a method for investment casting. The method comprises forming in a mold a two-phase disposable pattern of thermoplastic composition as described above and investing the pattern to form a cast.

DESCRIPTION OF THE PREFERRED EMBODIMENTS

In accordance with the present invention, it has been discovered that use of particulate thermosetting cross-linked poly(methylmethacrylate) as a filler in thermoplastic pattern compositions for disposable thermoplastic patterns applicable to investment casting processes can substantially reduce the residual ash encountered with conventional pattern compositions and so results in improved patterns. Such benefits are particularly surprising in view of the fact that cross-linked poly(methylmethacrylate) ordinarily is used in connection with such applications as ion exchange resins and is not considered in conjunction with investment casting.

It further has been discovered that use of such thermoplastic compositions in disposable thermoplastic patterns results in patterns having highly desirable characteristics, such as superior dimensional reproducibility and highly accurate surface finishes.

More particularly, it has been found that significantly less ash residue is associated with disposable patterns formed of a composition comprising finely divided cross-linked poly(methylmethacrylate) throughout an organic thermoplastic material than is associated with patterns formed of the thermoplastic material comprising conventional filler. Not only that, but such cross-linked poly(methylmethacrylate) is physically stable at temperatures considerably higher than the melting point of thermoplastic materials currently used in the production of disposable patterns and thus serves as a superior filler. By physically stable, it is meant that at the temperature of concern, the composition does not melt or decompose and discrete particles of the composition distributed throughout a thermoplastic retain their particulate, discrete and "solid" nature; that is, the particles retain their character as a filler.

In contrast to methylmethacrylate itself, such cross-linked poly(methylmethacrylate) does not tend to melt or decompose unless temperatures greatly exceed the melting point of the thermoplastic material into which the cross-linked poly(methylmethacrylate) is incorporated. As a result, it has been found that exposure to reasonably high temperatures, even temperatures in excess of those to which fillers currently in use are subjected, during pattern formation generally does not destroy or melt the cross-linked poly(methylmethacrylate) filler.

Accordingly, thermoplastic materials having higher melt points than do those used in current practice may be employed—despite the higher temperatures, the cross-linked poly(methylmethacrylate) portion of the composition remains stable during the investment casting process, and the thermal expansion of the overall pattern is limited. Therefore, distortion of the pattern would be relatively minor even after exposure to such higher temperature, and a greater variety of thermoplastics are available for use in the patterns. Moreover, the relatively low thermal conductivity of the cross-linked poly(methylmethacrylate) tends to prevent or limit premature expansion of the composition on autoclaving and so tends to avoid excessive shell cracking.

In addition, the use of cross-linked poly(methylmethacrylate) has been found to cause the disposable pattern material in which it is incorporated to flow out of ceramic molds more readily and completely than do many conventional disposable pattern materials. Thus, when the composition is melted, and little if any agitation is applied, the composition does not tend to adhere to the inner surface of the ceramic shell, to degrade the fidelity of the surface or to form nonmetallic inclusions in the finished castings.

Further, not only is the cross-linked poly(methylmethacrylate) filler of this invention generally free of inorganic impurities which may be left behind after burning and which could adversely affect the surface of a ceramic mold and metallurgical properties of the finished casting formed in the ceramic mold, but also the cross-linked poly(methylmethacrylate) filler is water insoluble in its thermoplastic matrix and does not tend to absorb water into its matrix.

Thus, the filler neither tends to change the physical properties of the matrix during prolonged storage or use, nor tends to leave a significant amount of ash residue in the mold.

It has also been found that disposable thermoplastic patterns comprising a thermoplastic pattern material having cross-linked poly(methylmethacrylate) filler dispersed therethrough have a variety of properties superior to the patterns of the prior art, such as highly accurate dimensional and surface characteristics.

The terms "organic thermoplastic pattern materials", or simply "thermoplastic materials", as used herein refer to natural or synthetic remeltable compositions that comprise a thermoplastic such as wax, any of various thermoplastic polymers, any of various thermoplastic resins or a combination thereof. Such compositions will be readily apparent to those of ordinary skill in the art, and organic thermoplastic materials useful in forming conventional thermoplastic patterns by conventional investment casting techniques are suitable for use in forming the thermoplastic patterns of this invention.

Accordingly, the thermoplastic materials of this invention typically make up at least about 30% by weight of the pattern composition and may comprise such conventional thermoplastics as waxes, including natural waxes such as beeswax, other natural thermoplastics, including gum damar, gum rosin, esparto waxes and the like, mineral waxes and petroleum waxes, modified waxes such as microcrystalline waxes, and synthetic thermoplastics. In addition to the thermoplastic, the thermoplastic material of this invention also, as with prior art compositions, typically may comprise various other polymers, resins and fillers. Thus, for example and not by way of limitation, typically such compositions have comprised about 25% by weight wax and 75% by weight other polymers, resins and fillers.

Regardless of the particular composition of the thermoplastic material employed in the investment casting process, the material should have an acceptably low viscosity at temperatures applied for melting the material and removing it from the cast. Such temperatures should be relatively low to avoid the difficulties and costs in achieving relatively high temperatures and the undesirable side effects, such as cracking of the cast, associated with such high temperatures. Accordingly, at 200° F., the viscosity of the thermoplastic material should be less than about 20,000 cps, preferably less than about 10,000 cps.

Especially preferred thermoplastics useful in this invention include, but are not limited to, wax, stearic acid and natural and synthetic thermoplastic resins such as rosin and polyethylene. Any of a wide variety of waxes, including any of the waxes conventionally used in commercial thermoplastic pattern forming compositions, such as paraffin, carnauba wax and microcrystalline wax, may be incorporated in the thermoplastic pattern material. Thermoplastics and other polymers, resins and fillers appropriate for the pattern materials of this invention will be readily apparent to those skilled in the art.

Typically, disposable pattern materials of this invention further comprise about 10 to about 50% by weight petroleum waxes and hydrocarbon resins to aid the material in melting and flowing into a mold, such as an aluminum die. Other compositions, such as ethylene vinyl acetate, polyethylene or other polymers are added to increase the viscosity of the melted material and to increase the hardness and toughness of the solidified material.

The cross-linked poly(methylmethacrylate) of this invention is a polymer of methylmethacrylate cross-linked with an agent selected to produce a cross-linked product that is physically stable at temperatures in excess of the melting point of the thermoplastic material, and the cross-linked product is utilized in a finely divided particulate state. Suitable cross-linking agents include divinylbenzene and diacrylate cross-linkers. It is also preferred that the particles are in the form of beads, and most desirably, the particles are generally spherical, although any particulate form, including ground particles, is acceptable.

The cross-linked poly(methylmethacrylate) of this invention may be manufactured by conventional polymerization and cross-linking techniques. The degree of cross-linking with divinylbenzene or other agent and the relative proportions should be such that the resulting cross-linked product is a material of melting point (or glass transition temperature) significantly above the temperatures ordinarily encountered in investment casting; i.e., about 130° F. to about 160° F. Thus, the cross-linked product should remain physically stable at temperatures certainly above 130° F., preferably above about 160° F., especially above about 200° F., and optimally above about 250° F., a temperature sometimes encountered in investment casting. Moreover, it is ideally desirable that the cross-linked product be grindable for use as a filler, and so remain physically stable at temperatures encountered in such grinding, i.e., 400° F.

Thus, small particles of cross-linked poly(methylmethacrylate) can be formed by standard polymerization techniques to yield a product of low ash content and less than about 0.1%, and generally less than about 0.01%, by weight water. The density of such particles is close to that of the organic thermoplastic material with which they will be mixed at a later time. The preferred particle size range is standard for fillers, namely, about 175 to 250 mesh. For an exemplary filler, at least 90%, preferably 100%, by weight passes through 100 mesh and at least about 50%, preferably about 50%, by weight passes through 200 mesh.

The cross-linked poly(methylmethacrylate) may be stored for use at a later time as filler in disposable pattern material. At such time, disposable pattern compositions comprising at least about 5% by weight, generally, between about 5% by weight and about 70% by weight, preferably about 20% by weight to about 60% by weight, of particulate cross-linked poly(methylmethacrylate) uniformly distributed throughout thermoplastic material and other filler materials are produced by homogeneous melt blending in the manner conventionally carried out with prior art fillers such as polystyrene. The particles serve as an effective filler, retaining their discrete particulate identity in the material and remaining physically stable at the temperatures noted above.

Thus, this invention provides improved disposable thermoplastic pattern forming materials and improved disposable patterns, i.e., solid bodies of any predetermined shape, and consisting of a two-phase system in which the cross-linked poly(methylmethacrylate) particles are somewhat uniformly distributed throughout a continuous phase of thermoplastic material. It provides an improved method of investment casting in which disposable patterns are formed of composition of this invention, and are then invested, as in ceramic or a refractory or the like, to form an improved cast.

The following example illustrates the invention:

EXAMPLE 1

A conventional thermoplastic pattern material was produced by conventional means by melting, mixing and homogeneously dispersing the following at about 250° F.:

| | |
|---|---|
| Shell 400 Micro crystalline wax | 118 lbs. |
| Candelilla Flake | 60 lbs. |
| Montan Wax | 30 lbs. |
| 143° m.p. Paraffin Wax | 121 lbs. |
| Durez 219 (a thermoplastic, oil-soluble high melting terpene phenolic resin in lump form, commercially available from Occidental Chemical Corporation) resin | 61 lbs. |
| Paraflint (a synthetic high melting point paraffin) | 4 lbs. |

Thus, a homogeneous melt was formed. The melt was reduced in temperature to about 220° F., which maintained its molten state, and particulate cross-linked poly(methylmethacrylate) (263 lbs.) from Rohm and Haas Company, Philadelphia, Pa. (Romax G-165 Resin) was blended with the homogeneous melt such that the cross-linked poly(methylmethacrylate) retained its particulate identity.

A disposable pattern was then prepared from the material. The disposable pattern had very little residual ash and very little erosion and wetting of the ceramic surface, and thereby produced a casting with a highly accurate surface finish.

In view of the above, it will be seen that the several objects of the invention are achieved and other advantageous results attained.

As various changes could be made in the above compositions and methods without departing from the scope of the invention, it is intended that all matter contained in the above description or shown in the accompanying drawings shall be interpreted as illustrative and not in a limiting sense.

What is claimed is:

1. A method for investment casting comprising:
   (a) forming in a mold a two-phase disposable pattern of a thermoplastic composition adapted for forming thermoplastic patterns, said composition being suitable for use as a pattern material for investment casting and comprising at least about 30% by weight of a continuous phase of an organic thermoplastic material having a viscosity at 200° F. of less than about 20,000 cps and, as a filler, at least about 5% by weight of a dispersed phase of discrete particles of a cross-linked polymer of methyl methacrylate that are physically stable at temperatures about 130° F.; and
   (b) investing said pattern to form a cast.

2. A method as set forth in claim 1, wherein said cross-linked polymer of methyl methacrylate is a copolymer of methyl methacrylate and divinyl benzene.

3. A method as set forth in claim 1 wherein said cross linked polymer of methyl methacrylate is a copolymer of methyl methacrylate and a diacrylate.

* * * * *